United States Patent
Lund et al.

(10) Patent No.: US 6,911,922 B2
(45) Date of Patent: *Jun. 28, 2005

(54) METHOD TO OVERLAY A SECONDARY COMMUNICATION CHANNEL ONTO AN ENCODED PRIMARY COMMUNICATION CHANNEL

(75) Inventors: Martin Lund, Menlo Park, CA (US); Howard Baumer, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/829,636

(22) Filed: Apr. 22, 2004

(65) Prior Publication Data

US 2004/0196165 A1 Oct. 7, 2004

Related U.S. Application Data

(63) Continuation of application No. 10/454,273, filed on Jun. 4, 2003, now Pat. No. 6,859,154.
(60) Provisional application No. 60/463,000, filed on Apr. 15, 2003, provisional application No. 60/448,703, filed on Feb. 18, 2003, and provisional application No. 60/446,894, filed on Feb. 12, 2003.

(51) Int. Cl.⁷ ............................................... H03M 7/40
(52) U.S. Cl. .............................. 341/65; 341/50; 341/51
(58) Field of Search ............................ 341/65, 50, 51, 341/59, 110; 714/758; 704/229

(56) References Cited

U.S. PATENT DOCUMENTS

| | | | | |
|---|---|---|---|---|
| 4,575,709 A | * | 3/1986 | Tomlinson | 341/110 |
| 5,825,976 A | * | 10/1998 | Dorward et al. | 704/229 |
| 6,198,413 B1 | * | 3/2001 | Widmer | 341/59 |
| 6,392,570 B1 | * | 5/2002 | Bucht | 341/59 |
| 6,421,527 B1 | * | 7/2002 | DeMartin et al. | 455/67.13 |
| 6,427,219 B1 | * | 7/2002 | Yang | 714/758 |

* cited by examiner

*Primary Examiner*—Jean Bruner Jeanglaude
(74) *Attorney, Agent, or Firm*—McAndrews, Held & Malloy Ltd.

(57) ABSTRACT

The disclosure relates to providing a secondary communication channel overlaid on a primary communication channel, using an enhanced encoding method, to effectively expand the utilized information capacity of the primary communication channel. A portion of at least a first word of one or more packets may be encoded in a datastream. A running disparity of the encoded word may be reversed. Hence, if an encoded running disparity of an encoded word is RD positive RD(+), then the running disparity is reversed to RD negative RD(−). Similarly, if an encoded running disparity is RD negative RD(−), then the running disparity is reversed to RD positive RD(+). The word may be a data word, control word or an idle word corresponding to a data packet, a control packet and an idle packet, respectively.

18 Claims, 7 Drawing Sheets

METHOD TO OVERLAY A SECONDARY COMMUNICATION CHANNEL ONTO AN ENCODED PRIMARY COMMUNICATION CHANNEL

CROSS-REFERENCE TO RELATED APPLICATIONS/INCORPORATION BY REFERENCE

This application is a continuation of U.S. application Ser. No. 10/454,273 filed on Jun. 4, 2003 is now a U.S. Pat. No. 6,859,154, which makes reference to, claims priority to, and claims the benefit of:
U.S. Provisional Application Ser. No. 60/446,894 filed Feb. 12, 2003;
U.S. Provisional Application Ser. No. 60/448,703 filed Feb. 18, 2003; and
U.S. Provisional Application Ser. No. 60/463,000 filed Apr. 15, 2003.

The above stated applications are incorporated herein by reference in their entirety.

FIELD OF THE INVENTION

Certain embodiments of the invention relate to encoding and decoding of information. More specifically, certain embodiments of the invention relate to a method and system for overlaying a secondary communication channel onto a primary communication channel.

BACKGROUND OF THE INVENTION

Figure 1:
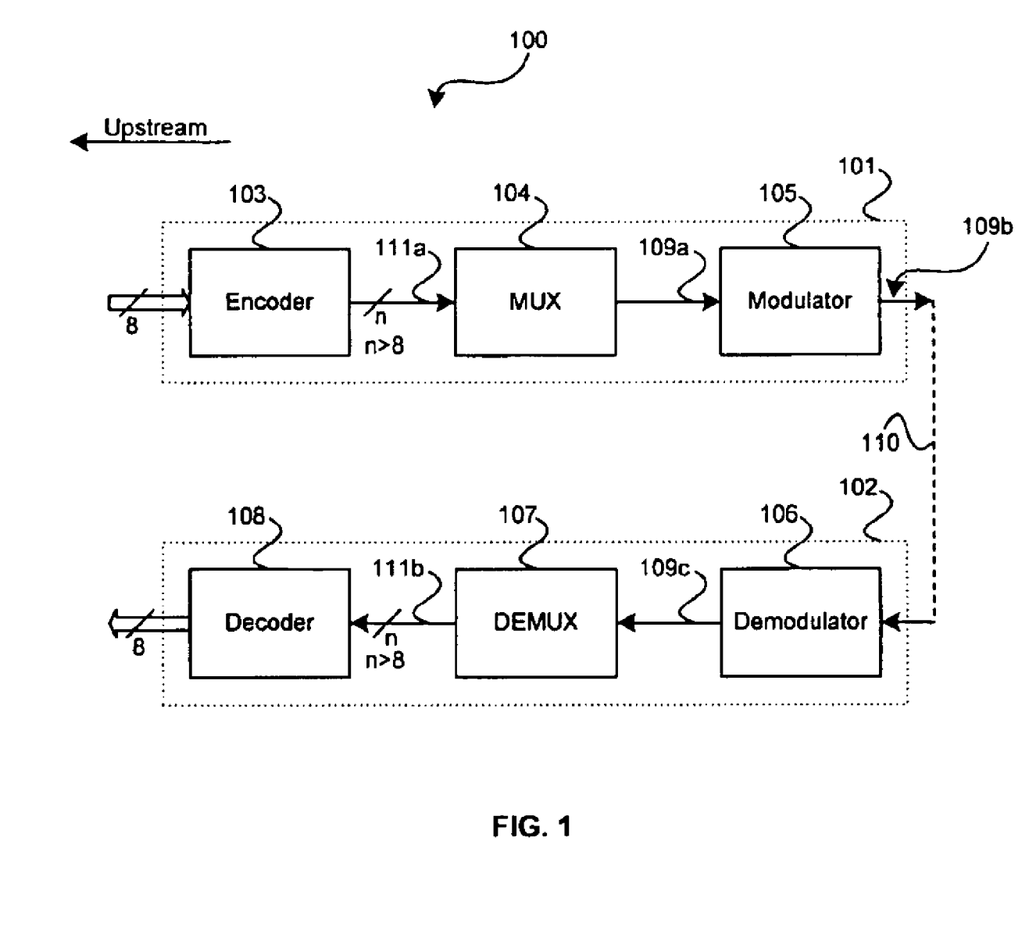
FIG. 1 is a block diagram illustrating a conventional digital communication link 100 having a transmitter side and a receiver side.

Serial data communication between two link partners in a digital communication system may be accomplished according to the general configuration of FIG. 1. FIG. 1 is a block diagram illustrating a conventional digital communication link 100 having a transmitter side 101 and a receiver side 102. The transmitter side 101 may include an encoder 103, a multiplexer (MUX) 104, and a modulator 105. The receiver side 102 may include a demodulator 106, a demultiplexer (DEMUX) 107, and a decoder 108. The transmitter side 101 and the receiver side 102 may be coupled by a link infrastructure 110. Alternatively, the link infrastructure may be a loopback path. Notwithstanding, the link infrastructure 110 may be, for example, shielded twisted pair, unshielded twisted pair (UTP), copper wire, or optical fiber or wireless Typically, the encoder 103 may be adapted to accept raw data bytes from an upstream component or entity of the digital communication system. The raw data bytes may be 4-bit, 8-bit, 16-bit, 32-bit or 64-bit words, for example, and may have been previously encrypted by an upstream component or entity of a digital communication system or the communication link 100. Prior encryption of the 8-bit words may ensure data integrity while the encrypted data traverses the digital communication link 100. Notwithstanding, the coded words may be coded in a manner specially designed to provide reliable transmission over the digital communication link 100.

The encoder 103 may encode each of the 8-bit words into a coded word having n bits. Generally, n is greater than eight (8) bits (n>8). Encoding the 8-bit words may generally be achieved by translating each 8-bit byte of data into a specially coded word having n bits where n is generally greater than eight (8). For example, for Gigabit Ethernet encoding, n is equal to ten (10). The additional (n−8) bits of data provide additional transmission overhead. The increased number of bits resulting from encoding may also provide data redundancy, which is typically utilized for error detection. In addition to the encoding of data words, the additional bits may also be encoded to form control words. Standardized coding such as 3B4B, 5B6B or 8B10B coding are typically utilized to ensure data integrity and transmission reliability.

Once the encoder 103 has encoded the raw data bytes, the resulting coded data 111a may be multiplexed into a serial bitstream 109a by the multiplexer 104. The resulting coded data 111a may also be converted a plurality of serial bit streams as in XAUI where 4 parallel lanes are utilized. The resulting multiplexed serial bitstream 109a may subsequently be transferred to the modulator 105 for processing. The modulator 105 may perform digital-to-analog conversion on the serial bitstream 109a, resulting in an equivalent or corresponding bitstream 109b. The resulting analog serial bitstream 109b may be transferred to the receiver side 102 via the link infrastructure or loopback 110.

The demodulator 106 on the receiver side 102 may be adapted to receive the analog serial bitstream 109b transferred from the transmitter side 101. The demodulator 106 may perform an analog-to-digital conversion on the received serial bitstream 109b, resulting in a serial digital bitstream 109c. The resulting serial digital bitstream 109c generated by the demodulator 106 may be transferred to the demultiplexer 107 for processing. The demultiplexer 107 may be configured to demultiplex the serial digital bitstream 109c by executing the opposite of the multiplexing function performed by multiplexer 104.

The demultiplexer 107 may translate the serial bitstream 109c back into a datastream 111b containing n-bit coded words. For example, in the case of gigabit Ethernet, the demultiplexer 107 may translate the serial bitstream 109c back into 10-bit coded words. The n-bit coded words produced by the demultiplexer 107 may subsequently be transferred to the decoder 108 for processing. The decoder 108 may be adapted to execute the opposite of the encoder function performed by the encoder 103. In this regard, the decoder 108 may convert the n-bit coded words back into 8-bit unencoded bytes. These 8-bit unencoded bytes, if previously encrypted, may be decrypted by an upstream component of the digital communication link 100, for example.

Some coding schemes such as 3B4B, 5B6B and 8B10B encoding, utilize a concept referred to as running disparity (RD). Running disparity refers to the sign, whether positive (+) or negative (−), of a running digital sum (RDS) value. The running digital sum value may represent the running sum of the encoded bits used to represent unencoded data. Typically, logic one (1) may be represented by a positive one (+1) and a logic zero (0) may be represented by a negative one (−1). The running disparity and running digital sum are used in encoding to minimize the DC component of the transmitted coded words on the digital communication link 100.

For example, the 8B10B code is an encoding scheme that translates 8-bit bytes into 10-bit coded words using the running disparity. Some of the features provided by the 8B10B coding scheme may include DC balance, a maximum run length of 5, a maximum RDS of 3, a transition density of 3 to 8 transitions per 10-bit code group, separate code groups for control signaling, and a comma for synchronization of code groups. Below is a standardized 8B10B table that illustrates exemplary data code groups and their corresponding RD(−) and RD(+) translations. The first column of the table, referred to as the code group name, contains data values to be encoded. The second column of the table represents corresponding octal values for the data values to be encoded. The third column of the table represents corresponding byte bits values for the data values to be encoded. The fourth column represents the corresponding encoded (RD−) values for the data values that were to be encoded. Finally, the fifth column represents the encoded (RD+) values for the data values that were to be encoded.

| Code-Group Name | Byte Value | Byte Bits HGF EDCBA | RD (−) abcdei fghj | RD (+) abcdei fghj |
|---|---|---|---|---|
| D0.0 | 00 | 000 00000 | 100111 0100 | 011000 1011 |
| D1.0 | 01 | 000 00001 | 011101 0100 | 100010 1011 |
| D2.0 | 02 | 000 00010 | 101101 0100 | 010010 1011 |
| . | . | . | . | . |
| . | . | . | . | . |
| . | . | . | . | . |
| D0.1 | 20 | 001 00000 | 100111 1001 | 011000 1001 |
| D1.1 | 21 | 001 00001 | 011101 1001 | 100010 1001 |
| D2.1 | 22 | 011 00010 | 101101 1001 | 010010 1001 |
| . | . | . | . | . |
| . | . | . | . | . |
| . | . | . | . | . |
| D0.2 | 40 | 010 00000 | 100111 0101 | 011000 0101 |
| D1.2 | 41 | 010 00001 | 011101 0101 | 100010 0101 |
| D2.2 | 42 | 010 00010 | 101101 0101 | 010010 0101 |
| . | . | . | . | . |
| . | . | . | . | . |
| . | . | . | . | . |
| D0.3 | 60 | 011 00000 | 100111 0011 | 011000 1100 |
| D1.3 | 61 | 011 00001 | 011101 0011 | 100010 1100 |
| D2.3 | 62 | 011 00010 | 101101 0011 | 010010 1100 |
| . | . | . | . | . |
| . | . | . | . | . |
| . | . | . | . | . |
| D0.4 | 80 | 100 00000 | 100111 0010 | 011000 1101 |
| D1.4 | 81 | 100 00001 | 011101 0010 | 100010 1101 |
| D2.4 | 82 | 100 00010 | 101101 0010 | 010010 1101 |
| . | . | . | . | . |
| . | . | . | . | . |
| . | . | . | . | . |
| D0.5 | A0 | 101 00000 | 100111 1010 | 011000 1010 |
| D1.5 | A1 | 101 00001 | 011101 1010 | 100010 1010 |
| D2.5 | A2 | 101 00010 | 101101 1010 | 010010 1010 |
| . | . | . | . | . |
| . | . | . | . | . |
| . | . | . | . | . |
| D0.6 | C0 | 110 00000 | 100111 0110 | 011000 0110 |
| D1.6 | C1 | 110 00001 | 011101 0110 | 100010 0110 |
| D2.6 | C2 | 110 00010 | 101101 0110 | 010010 0110 |
| . | . | . | . | . |
| . | . | . | . | . |
| . | . | . | . | . |
| D0.7 | E0 | 111 00000 | 100111 0001 | 011000 1110 |
| D1.7 | E1 | 111 00001 | 011101 0001 | 100010 1110 |
| D2.7 | E2 | 111 00010 | 101101 0001 | 010010 1110 |
| . | . | . | . | . |
| . | . | . | . | . |
| . | . | . | . | . |
| D31.7 | FF | 111 11111 | 101011 0001 | 010100 1110 |

Figure 2:
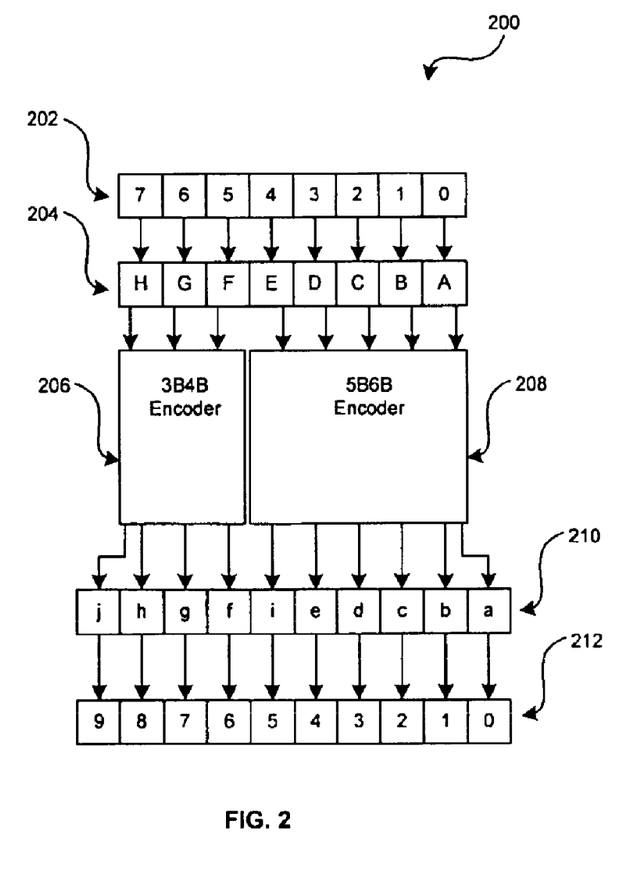
FIG. 2 is an encoder system that may be utilized for generating standardized 8B/10B encoding as illustrated in the table above.

FIG. 2 is an encoder system 200 that may be utilized for generating standardized 8B/10B encoding as illustrated in the table above. Referring to FIG. 2, the encoder system 200 may include an input byte bit block 202, an input byte bit label block 204, a 3B4B encoder block 206, a 4B5B encoder block 208, an output code-group bit label block 210 and an encoded output code-group block 212. Input byte bit label block 204 illustrates the arrangement or mapping of the input byte bits corresponding to the input byte bit block 202. Accordingly, input bit 0 corresponds to A, input bit 1 corresponds to B, input bit 2 corresponds to C, input bit 3 corresponds to D, input bit 4 corresponds to E, input bit 5 corresponds to F, input bit 6 corresponds to G, and input bit 7 corresponds to H.

Input byte bits A, B, C, D and E are routed to the input of the 5B6B encoder bock 208 and input byte bits F, G and H are routed to the input of the 3B4B encoder block 206. The output encoded bits generated by the encoder block 208 includes output code group bits a, b, c d, e and i. The output encoded bits generated by the encoder block 206 includes output code group bits f, g, h and j. The byte code-groups bits in the output code-group bit label block 210 are mapped to corresponding bits in the encoded output code-group block 212. Accordingly, output bit a corresponds to 0 output bit b corresponds to 1 output bit c corresponds to 2 output bit d corresponds to 3 output bit e corresponds to 4 output bit i corresponds to 5 output bit f corresponds to bit 6, output bit g corresponds to 7 output bit h corresponds to 8 output bit j corresponds to 9. Accordingly, the encoder system 200 encodes an 8-bit input to the input byte bit block 202 into a corresponding 10-bit output at the encoded output code-group block 212.

The encoder system 200 of FIG. 2 utilizes a 5B6B sub-block and a 3B4B sub-block to generate the 8B10B code. In this regard, a 5B6B code table and a 3B4B code may be utilized to generate an 8B10B code table similar the table above. Each of the 5B6B and 3B4B tables may have an current RD(−) column and a current RD(+) column. The current RD may refer to a state of the RD at the end of a last sub-block. Various rules may be implemented to generate the encoded 8B10B code-groups. As referenced in the table and FIG. 2, the first six bits a, b, c, d, e and i may form a first sub-block and the second four bits f, g, h and j may form a second sub-block corresponding to 5B6B encoder block 208 and 3B4B encoder block 206 respectively. An RD at the beginning of the 6-bit for first sub-block is the RD at the end of the last code-group. The RD at the beginning of the 4-bit or second sub-block corresponds to the RD at the end of the 6-bit sub-block. The RD at the end of the code-group corresponds to the RD at the end of the 4-bit sub-block.

The RD at the end of any sub-block is positive in instances where the sub-block contains more ones than zeros. The RD is also positive at the end of the 6-bit or first sub-block if the 6-bit sub-block is 000111. The RD is also positive at the end of the 4-bit or second sub-block whenever the 4-bit sub-block is 0011. The RD at the end of any sub-block may be negative in instances where the sub-block contains more zeros than ones. The RD may also be negative at the end of the 6-bit or first sub-block in cases where the 6-bit or first sub-block is 111000. Similarly, the RD is also negative at the end of the 4-bit or second sub-block whenever the 4-bit sub-block is 1100. In other instances, the RD at the end of the sub-block may be the same as at the beginning of the sub-block. In order to limit run length for both ones and zeros between the sub-blocks, sub-blocks that are encoded as 000111 or 0011 may be generated only when the RD at the beginning of the sub-block is positive. Accordingly, the RD at the end of these sub-blocks will also be positive. Likewise, sub-blocks that are encoded as 111000 or 1100 may be generated only when the RD at the beginning of the sub-block is negative. Accordingly, the RD at the end of these sub-blocks will also be negative.

On the transmitter side, during encoding, a transmitter or encoder will assume an initial negative RD. On the receiver side, a negative or positive RD may be assumed by the receiver. On the receiver side, during decoding, code-groups may be checked to determine their validity. If a current code-group is valid, the new RD will be generated. Since an RD must either be zero (0) or one (1), the RD may be utilized to check errors.

The stream of encoded data words transmitted across the link infrastructure 110, using a current running disparity encoding scheme, constitute a primary communication channel with a certain limited utilized information capacity.

Further limitations and disadvantages of conventional and traditional approaches will become apparent to one of skill in the art, through comparison of such systems with some aspects of the invention as set forth in the remainder of the present application with reference to the drawings.

BRIEF SUMMARY OF THE INVENTION

Aspects of the invention provide a method and system for processing information in a communication channel. More particularly, the invention provides a method and system for encoding a communication channel so that a secondary channel may be overlaid on a primary channel. Aspects of the method may include encoding a portion of at least a first word of one or more packets in a datastream. A running disparity of the encoded word may be reversed. Hence, if an encoded running disparity of an encoded word is RD positive RD(+), then the running disparity is reversed to RD negative RD(−). Similarly, if an encoded running disparity is RD negative RD(−), then the running disparity is reversed to RD positive RD(+). The word may be a data word, control word or an idle word corresponding to a data packet, a control packet and an idle packet, respectively.

The method may also include assigning n bits of information to each word, where n is greater than or equal to 1 thereby generating $2^n-1$ enhanced words having reversed running disparities. A secondary channel overlaid on the primary communication channel may be controlled with the n assigned bits. The number of words in a packet utilized for enhanced encoding may be dynamically changed or resized among packets during enhanced encoding. Words utilized for enhanced encoding may be randomly selected among the packets. Hence, a first word may be randomly selected from a first packet and a second word may be randomly selected from a second packet.

An encoded portion of a word having a reversed disparity may be received and a determination made as to whether the disparity has been reversed. Upon determining that the disparity has been reversed, the reversed disparity may be reversed to its normal RD value. Secondary channel information may be received and utilized for controlling the enhanced encoding of words.

Another embodiment of the invention may provide a machine-readable storage, having stored thereon, a computer program having at least one code section executable by a machine, thereby causing the machine to perform the steps as described above for overlaying a secondary communication channel on an encoded primary communication channel.

Aspects of the system for processing information in a primary communication channel may result in a secondary communication channel being overlaid on an encoded primary communication channel. The system may include at least one enhanced encoder that encodes at least a portion of at least a first word of one or more packets in a datastream. The enhanced encoder may reverse a running disparity of the encoded word. Hence, if an encoded running disparity of an encoded word is RD positive RD(+), then the enhanced encoder reverses the running disparity to RD negative RD(−). Similarly, if an encoded running disparity is RD negative RD(−), then the enhanced encoder reverses the running disparity to RD positive RD(+). The word may be a data word, control word or an idle word corresponding to a data packet, a control packet and an idle packet, respectively.

The enhanced encoder may also assign n bits of information to each word, where n is greater than or equal to 1 thereby generating $2^n-1$ enhanced words having reversed running disparities. A secondary channel overlaid on the primary communication channel may be controller using the n assigned bits. The enhanced encoder may dynamically change or resize the number of words in a packet utilized for enhanced encoding among various packets during enhanced encoding. Words utilized for enhanced encoding may be randomly selected among the packets by the enhanced encoder. Hence, a first word may be randomly selected from a first packet and a second word may be randomly selected from a second packet.

An enhanced decoder may receive an encoded portion of a word having a reversed disparity and a determination made as to whether the disparity has been reversed. Upon determining that the disparity has been reversed, the enhanced decoder may reverse the disparity. The enhanced encoder may receive secondary channel information, which may be utilized for controlling the enhanced encoding of words. In this regard, the enhanced encoder may utilize the secondary channel information to control reversal of the running disparity.

These and other advantages, aspects and novel features of the present invention, as well as details of a illustrated embodiment thereof, will be more fully understood from the following description and drawings.

DETAILED DESCRIPTION OF THE INVENTION

Certain embodiments of the invention relate to information encoding. In particular, certain embodiments of the invention relate to providing a secondary communication channel overlaid on a primary communication channel, using an enhanced encoding method, to effectively expand the utilized information capacity of the primary communication channel. Aspects of the invention may include encoding a portion of at least a first word of one or more packets in a datastream. A running disparity of the encoded word may be reversed. Hence, if an encoded running disparity of an encoded word is RD positive RD(+), then the running disparity is reversed to RD negative RD(−). Similarly, if an encoded running disparity is RD negative RD(−), then the running disparity is reversed to RD positive RD(+). The word may be a data word, control word or an idle word corresponding to a data packet, a control packet and an idle packet, respectively.

Figure 3:
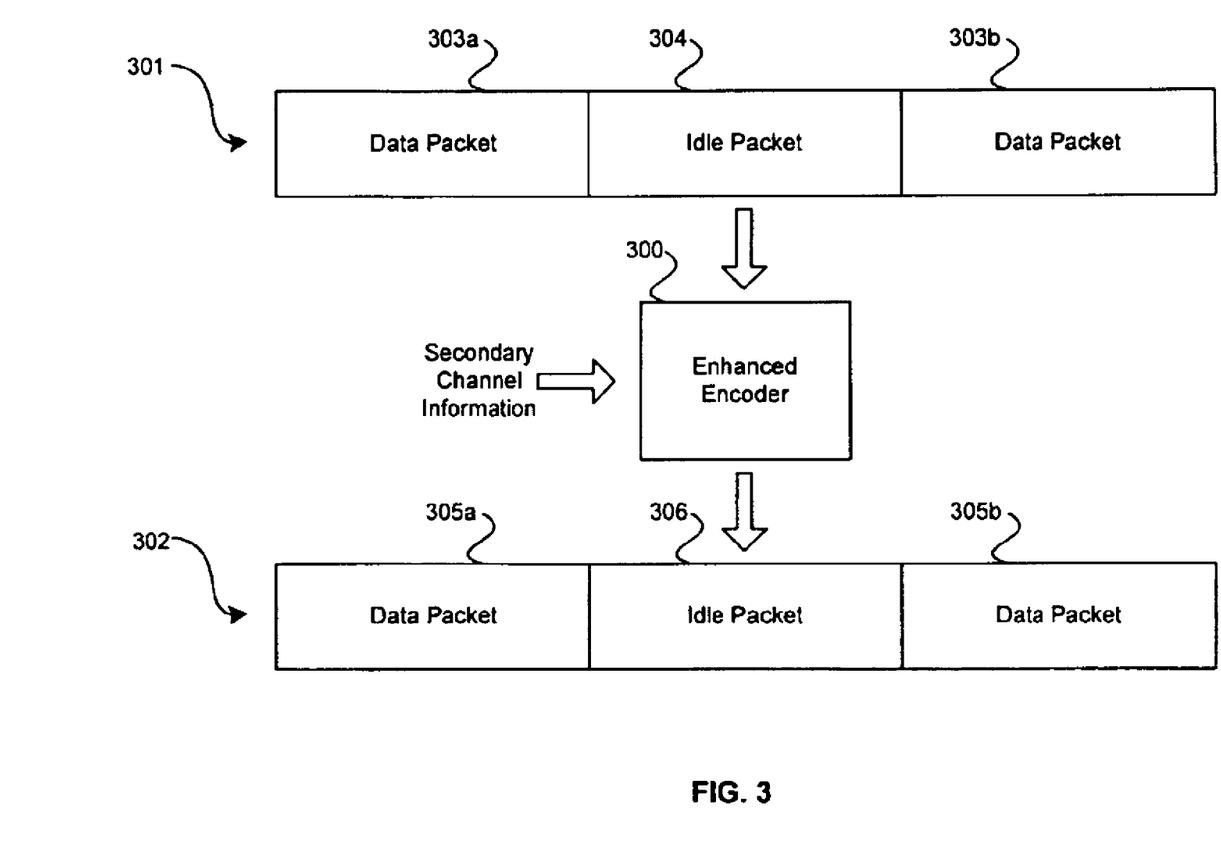
FIG. 3 is a block diagram illustrating encoding data packets and idle packets in accordance with an embodiment of the invention.

FIG. 3 is a block diagram illustrating encoding data packets and idle packets in accordance with an embodiment of the invention. Referring to FIG. 3, there is shown a stream of unencoded packets 301, an enhanced encoder block 300 and a stream of enhanced encoded packets 302. The stream of unencoded packets 301 may include a first unencoded data packet 303a, a second unencoded data 303b and an unencoded idle packet 304. The stream of encoded packets 302 may include a first encoded data packet 305a, a second encoded data 305b and an encoded idle packet 306, and are also shown.

The unencoded idle packet 304 may be located between first unencoded data packet 303a and the second unencoded data packet 303b. The first unencoded data packet 303a may include a block or plurality of unencoded data packets and the second unencoded data packet may also include a block or plurality of unencoded data plackets. Similarly, the unencoded idle packet 304 may include a block or plurality of unencoded idle packets. The unencoded idle packet 304 may be an unencoded inter-packet gap (IPG).

The encoded idle packet 306 may be located between encoded first data packet 305a and the second encoded data packet 305b. The first encoded data packet 305a may include a block or plurality of encoded data packets and the second encoded data packet 305b may also include a block or plurality of encoded data plackets. Similarly, the encoded idle packet 306 may include a block or plurality of encoded idle packets. The encoded idle packet 306 may be an encoded inter-packet gap (IPG), for example.

Information to be transmitted across a communication link may be packetized and organized as a stream of unencoded packets 301, which may comprise alternating data packets 303a, 303b and idle packets 304. The unencoded first and second data packets 303a, 303b may include a stream or block of unencoded data bytes in which each of the data bytes contain eight (8) bits for each data byte. The unencoded idle packet 304 may also include a stream or block of unencoded idle bytes in which each of the idle bytes contain eight (8) bits for each idle byte. Other packets sizes may also be utilized.

In accordance with an embodiment of the invention, a stream of unencoded packets 301 may be encoded according to an enhanced encoding method employed by the enhanced encoder 300 to form a resultant stream of enhanced encoded packets 302. The stream of enhanced encoded packets 302 produced by the enhanced encoding method employed by the enhanced encoder 300 may include alternating encoded data packets 305a, 305b and encoded idle packets 306. The enhanced encoding method employed by the enhanced encoder 300 may encode data bytes and/or idle bytes according to the rules utilized for generating running disparity, except that certain resultant encoded words within certain encoded packets may be forced to the opposite running disparity of what they normally would be. In other words, if a particular next encoded word would normally be taken from the RD(+) column of an encoding table, it may instead be forced to be taken from the RD(−) column of the encoding table based on secondary channel information 307 provided to the enhanced encoding method 300.

Figure 4:
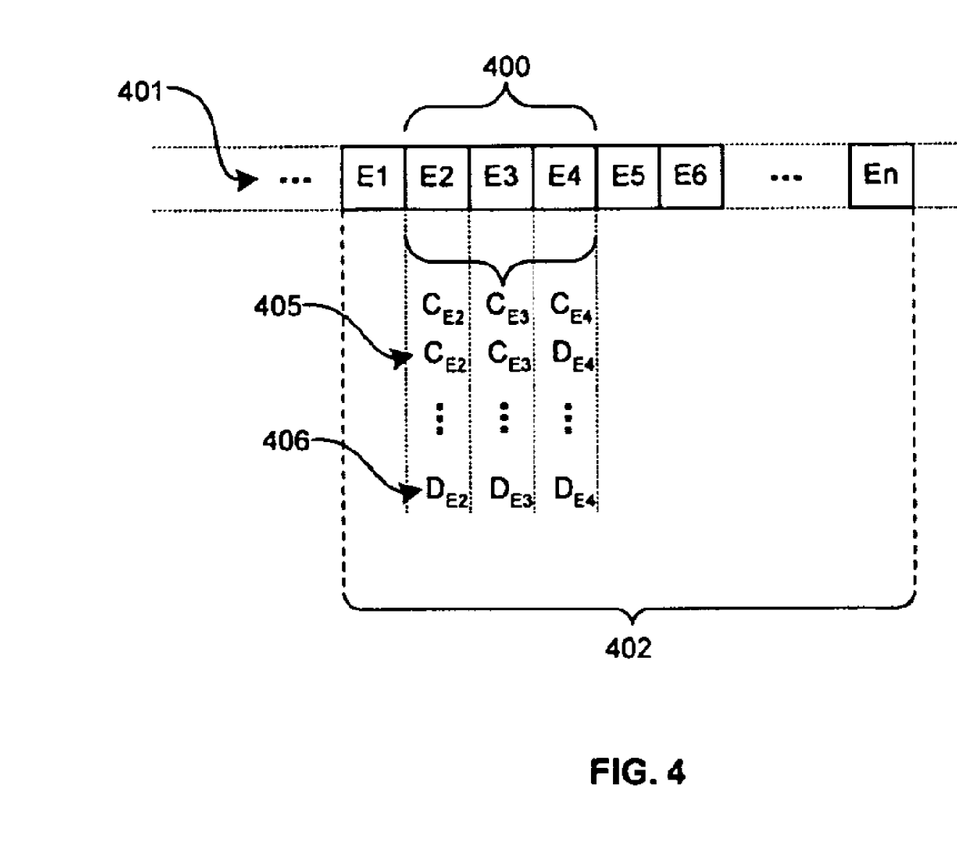
FIG. 4 is a diagram illustrating the overlaying of a secondary communication channel onto a primary communication channel utilizing the enhanced encoding of FIG. 3, in accordance with an embodiment of the invention.

FIG. 4 is a diagram illustrating the overlaying of a secondary communication channel 400 onto a primary communication channel 401 utilizing the enhanced encoding of FIG. 3, in accordance with an embodiment of the invention. Referring to FIG. 4, there is shown a portion of a data stream comprising a data packet 402 for a primary communication channel 401. The data packet 402 may include a plurality of unencoded data words E1, E2, E3, E4, E5, E6 . . . , En. In this regard, data packet 402 in the primary communication channel 401 may comprise n encoded data words E1 to En. The encoded data packets E2, E3, E4 may form the secondary communication channel 400. The secondary communication channel 400 is overlaid onto the primary communication channel 401 and may be referred to as an overlaid channel.

During normal encoding, each encoded data word in the encoded data packet 402 of the primary communication channel 401 will have a certain running disparity RD(+) or RD(−). In general, the enhanced encoding method utilized by the enhanced encoder 300 may utilize n data words where n may be greater than or equal to one (1). In another aspect of the invention, n may be less than one (1) representing enhanced coding of at least a portion of a data word. In this regard, more than a portion of one (1) data word may also be enhanced encoded in accordance with various embodiments of the invention.

Notwithstanding, the enhanced encoding method utilized by the encoder 300 may utilize, for example, three (3) encoded data words such as E2, E3, E4 in the encoded data packet 402 to create the secondary communication channel 400. In this case, n is equal to three (3). The enhanced encoding method employed by the encoder 300 may switch, reverse or change at least one of the three encoded data words E2, E3, E4 to the opposite running disparity based on the secondary channel information 307. In this regard, for example, if E4 of the current data packet was to come from the RD(+) column of the encoding table according to the conventional encoding scheme, the enhanced encoding method may force E4 to come from the RD(−) column instead, in order to encode secondary channel information 307 onto the primary communication channel 401.

As a result, by forcing E2, E3, and/or E4 to the opposite of the expected running disparity, a secondary information channel 400, which may be represented by three (3) bits of information has been created. Since the running disparity of any encoded data word may be either RD(+) or RD(−), the secondary channel of three (3) data bits representing the enhanced encoded data words allows $2^n-1$ additional pieces of information to be encoded. In this case, n is equal to three (3) and $2^3-1$ or seven (7) additional pieces of information may be encoded. As a result, three additional bits are required to represent the additional enhanced encoded words.

Referring to FIG. 4, the correct running disparity may be represented by C. Accordingly, conventional encoding of E2 would result in a corresponding running disparity of $C_{E2}$, conventional encoding of E3 would result in a corresponding running disparity of $C_{E3}$, and conventional encoding of E4 would result in a corresponding running disparity of $C_{E4}$. Enhanced encoding of E2 would result in a corresponding running disparity of $D_{E2}$, enhanced encoding of E3 would result in a corresponding running disparity of $D_{E3}$, and enhanced encoding of E4 would result in a corresponding running disparity of $D_{E4}$. Reference 405 illustrates E4 being reversed to an opposite running disparity $D_{E4}$. In this case, the single enhanced data word may result in the creation of a primary channel that may provide two additional pieces of information.

Similarly, reference 406 illustrates E2 being reversed to an opposite running disparity $D_{E2}$, E3 being reversed to an opposite running disparity $D_{E3}$, and E4 being reversed to an opposite running disparity $D_{E4}$. In this case all three (3) enhanced data words may result in the creation of a primary channel that may provide seven (7) additional pieces of information. The seven (7) additional pieces of information may require three (3) additional bits of information for encoding. The table below illustrates exemplary bit arrangements that may be utilized to represent the data words that may be generated.

|   | E2 | E3 | E4 |
|---|----|----|----|
| 1 | $C_{E2}$ | $C_{E3}$ | $C_{E4}$ |
| 2 | $C_{E2}$ | $C_{E3}$ | $D_{E4}$ |
| 3 | $C_{E2}$ | $D_{E3}$ | $C_{E4}$ |
| 4 | $C_{E2}$ | $D_{E3}$ | $D_{E4}$ |
| 5 | $D_{E2}$ | $C_{E3}$ | $C_{E4}$ |
| 6 | $D_{E2}$ | $C_{E3}$ | $D_{E4}$ |
| 7 | $D_{E2}$ | $D_{E3}$ | $C_{E4}$ |
| 8 | $D_{E2}$ | $D_{E3}$ | $D_{E4}$ |

The first entry (1) in the table may represent the correct encoding resulting from conventional encoding. The remaining entries two (2) through eight (8) represents at least one bit for at least one data word having a reversed or changed running disparity. Entry eight (8) illustrates a scenario in which all three (3) bits represent a running disparity of all three (3) data words being reversed.

The three (3) additional bits of information provided by the secondary channel 400 may represent certain system overhead information such as routing table information or flow control information. Other status or system information may be encoded into the secondary channel as well. The receiver side of the digital communication link will also need to know how to properly decode the secondary communication channel, interpreting data words having reversed running disparity as additional encoded information and not as errors. In this regard, the receiver side may require an enhanced encoder for enhanced decoding of the words that have reversed running disparity. In this regard, the receiver side may be capable of calculating the expected running disparity of the next encoded word received. If the actual running disparity of the next received encoded word turns out to be the opposite of what is expected, then the receiver side may interpret this as additional information and not as an error.

Certain error detection performance may be traded off in order to add the secondary communication channel. However, the enhanced encoding method utilized by the enhanced encoder 300 may be designed so that a required error specification may still be met while still providing an efficient secondary communication channel. Accordingly, some of the possible data words that may be generated by the enhanced encoding method utilized by the enhanced encoder 300 may not be utilized.

Figure 5:
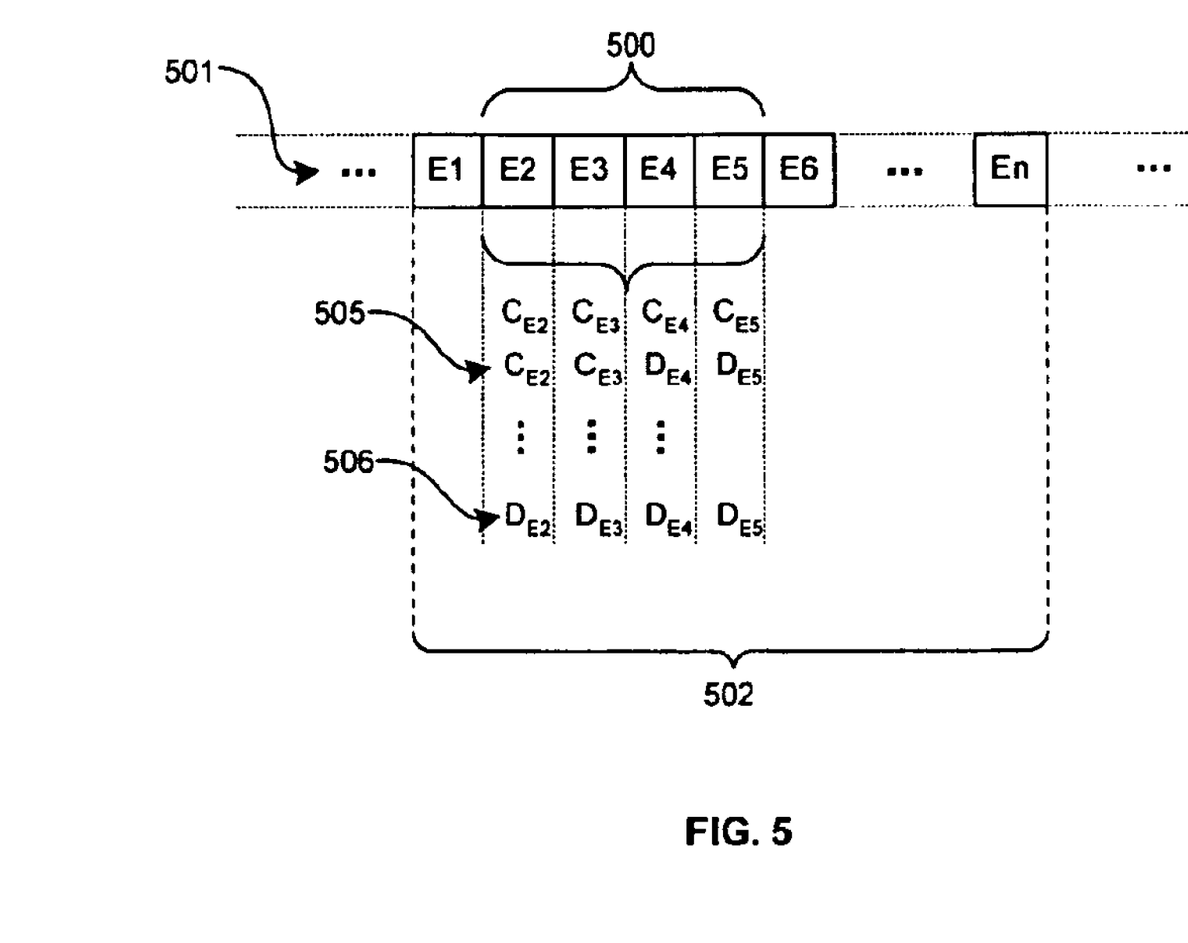
FIG. 5 is a diagram illustrating the overlaying of a secondary communication channel onto a primary communication channel utilizing the enhanced encoding of FIG. 3, in accordance with an embodiment of the invention.

In accordance with various embodiments of the invention, the secondary channel may not be limited to three bits of information. Accordingly, fewer that three, for example two (2), or greater than three (3), for example five (5), encoded data words may be utilized to form a secondary communication channel in the primary communication stream. FIG. 5 is a diagram illustrating the overlaying of a secondary communication channel 500 onto a primary communication channel 501 utilizing the enhanced encoding of FIG. 3, in accordance with an embodiment of the invention. FIG. 5 is similar to FIG. 4, except that FIG. 5 utilizes four (4) data words for the secondary communication channel 500. Data packet 502 may include E1, E2, E3, E4, E5, E6, . . . En.

Referring to FIG. 5, as in FIG. 4, the correct running disparity is represented by C. Accordingly, conventional encoding of E2 would result in a corresponding running disparity of $C_{E2}$, conventional encoding of E3 would result in a corresponding running disparity of $C_{E3}$, conventional encoding of E4 would result in a corresponding running disparity of $C_{E4}$ and conventional encoding of E5 would result in a corresponding running disparity of $C_{E5}$. Enhanced encoding of E2 would result in a corresponding running disparity of $D_{E2}$ and enhanced encoding of E3 would result in a corresponding running disparity of $D_{E3}$, Similarly, enhanced encoding of E4 would result in a corresponding running disparity of $D_{E4}$ and enhanced encoding of E5 would result in a corresponding running disparity of $D_{E5}$. Reference 505 illustrates E5 being reversed to an opposite running disparity $D_{E5}$. In this case, the single enhanced data word may result in the creation of a primary channel that may provide two additional pieces of information.

In a similar manner, reference 506 illustrates E2 being reversed to an opposite running disparity $D_{E2}$, E3 being reversed to an opposite running disparity $D_{E3}$, E4 being reversed to an opposite running disparity $D_{E4}$ and E5 being reversed to an opposite running disparity $D_{E5}$. In this case, all four (4) enhanced data words may result in the creation of a primary channel that may provide fifteen (15) or ($2^4-1$) additional pieces of information requiring. Four (4) bits are therefore utilized for encoding to represent the additional fifteen (15) pieces of information. The table below illustrates exemplary bit arrangements that may be utilized to represent the data words that may be generated.

|    | E2 | E3 | E4 | E5 |
|----|----|----|----|----|
| 1  | $C_{E2}$ | $C_{E2}$ | $C_{E3}$ | $C_{E5}$ |
| 2  | $C_{E2}$ | $C_{E2}$ | $C_{E3}$ | $D_{E5}$ |
| 3  | $C_{E2}$ | $C_{E2}$ | $D_{E3}$ | $C_{E5}$ |
| 4  | $C_{E2}$ | $C_{E2}$ | $D_{E3}$ | $D_{E5}$ |
| 5  | $C_{E2}$ | $D_{E2}$ | $C_{E3}$ | $C_{E5}$ |
| 6  | $C_{E2}$ | $D_{E2}$ | $C_{E3}$ | $D_{E5}$ |
| 7  | $C_{E2}$ | $D_{E2}$ | $D_{E3}$ | $C_{E5}$ |
| 8  | $C_{E2}$ | $D_{E2}$ | $D_{E3}$ | $D_{E5}$ |
| 9  | $D_{E2}$ | $C_{E2}$ | $C_{E3}$ | $C_{E5}$ |
| 10 | $D_{E2}$ | $C_{E2}$ | $C_{E3}$ | $D_{E5}$ |
| 11 | $D_{E2}$ | $C_{E2}$ | $D_{E3}$ | $C_{E5}$ |
| 12 | $D_{E2}$ | $C_{E2}$ | $D_{E3}$ | $D_{E5}$ |
| 13 | $D_{E2}$ | $D_{E2}$ | $C_{E3}$ | $C_{E5}$ |
| 14 | $D_{E2}$ | $D_{E2}$ | $C_{E3}$ | $D_{E5}$ |
| 15 | $D_{E2}$ | $D_{E2}$ | $D_{E3}$ | $C_{E5}$ |
| 16 | $D_{E2}$ | $D_{E2}$ | $D_{E3}$ | $D_{E5}$ |

The first entry (1) in the table may represent the correct encoding resulting from conventional encoding. The remaining entries, two (2) through sixteen (16) represents at least one bit for at least one data word having a reversed or changed running disparity. Entry sixteen (16) illustrates a scenario in which all four (4) bits represents a running disparity of all four (4) data words being reversed. Accordingly, a secondary channel 500 comprising four bits of information overlays the primary channel 501.

In an embodiment of the invention, the secondary communication channel may be dynamic. In this regard, the number of data words encoded in the secondary communication channel may change from packet to packet. For example, a first packet containing a secondary communication channel may utilize three (3) data words or bits, a second packet containing a secondary communication channel may utilize five (5) bits, and a third packet containing a secondary communication channel may use two (2) bits. Each packet may communicate a different type of information about the system on its secondary communication channel.

Although data packets are utilized to illustrate the enhanced encoding employed by the enhanced encoder, the invention is not limited in this regard. Accordingly, data packets, control packets and/or idle packets may be used to encode a secondary communication channel. Additionally, not every packet in the primary communication channel stream may be encoded with a secondary channel. As a result, various levels of tradeoffs may be made between various performance parameters including, for example, DC balance, error detection, transitions and/or additional information transmitted. Although, 8B10B encoding is utilized to illustrate various aspects of the enhanced encoding performed by the enhanced encoder 300, the enhanced encoding method 300 may be based on other encoding schemes that use running disparity, in accordance with various embodiments of the present invention. For example, 3B4B and 5B6B encoding schemes may also utilize and benefit from the enhanced encoding method provided by the enhanced encoder 300.

Figure 6:
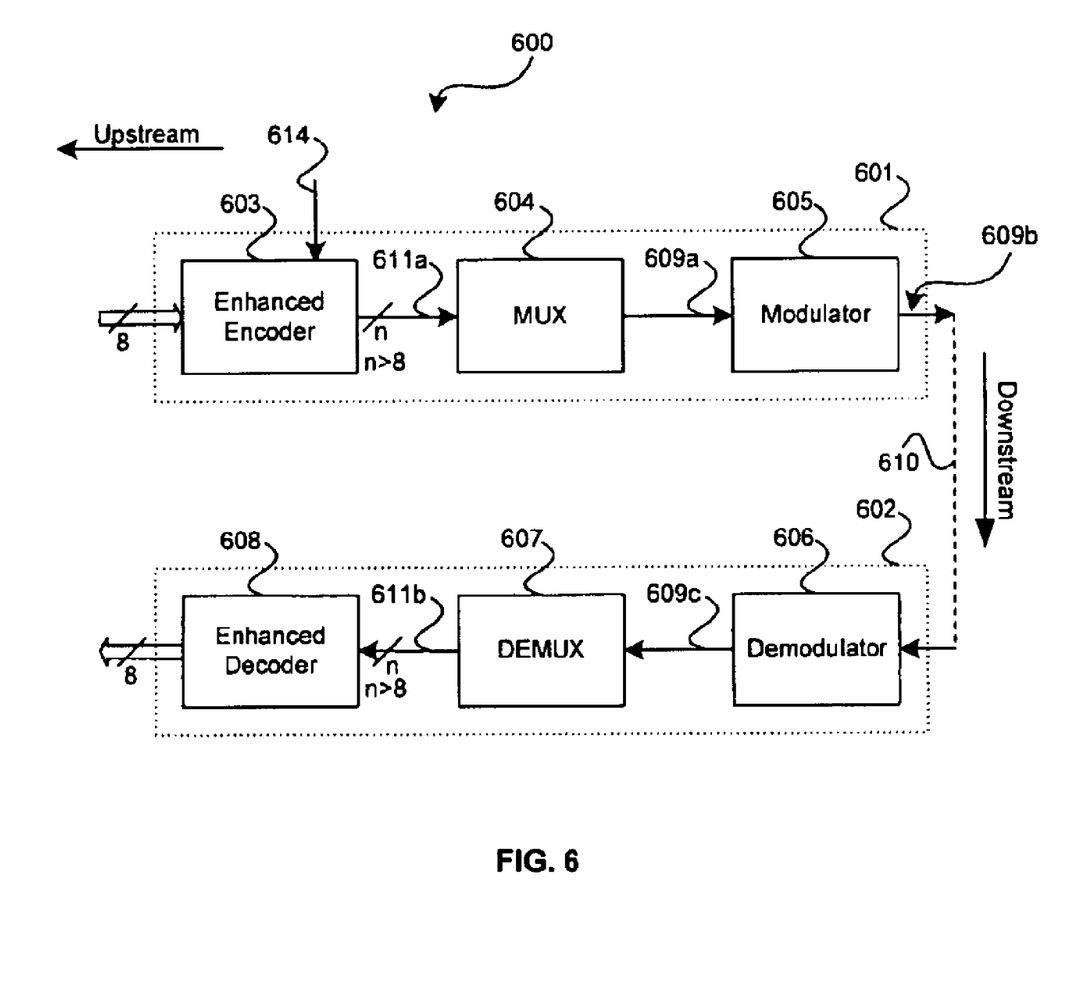
FIG. 6 is a block diagram of a system for overlaying a secondary communication channel on an encoded primary communication channel in accordance with an embodiment of the invention.

FIG. 6 is a block diagram of a system for overlaying a secondary communication channel on an encoded primary communication channel in accordance with an embodiment of the invention. Referring to FIG. 6, there is shown a communication link 600 illustrating an exemplary communication link 600 having a transmitter side 601 and a receiver side 602. The transmitter side 601 may include an enhanced encoder 603, a multiplexer (MUX) 604, and a modulator 605. The receiver side 602 may include a demodulator 606, a demultiplexer (DEMUX) 607, and an enhanced decoder 608. The transmitter side 601 and the receiver side 602 may be coupled by a link infrastructure 610. Alternatively, the link infrastructure may be a loopback path. If the transmitter side 601 is integrated within receiver side 602 in a single chip for example, the loopback may be internal. Otherwise, the loopback may be external. Notwithstanding, the link infrastructure 610 may be, for example, shielded twisted pair, unshielded twisted pair (UTP), copper wire, or optical fiber.

Typically, the encoder 603 may be adapted to accept raw data bytes from an upstream component or entity of the digital communication system. The raw data bytes may be 8-bit words and may have been previously encrypted by an upstream component or entity of a digital communication system or the communication link 600. Prior encryption of the 8-bit words may ensure data integrity while the encrypted data traverses the digital communication link 600. Notwithstanding, the coded words may be coded in an enhanced manner designed to provide reliable transmission and to more efficiently utilize bandwidth, for example, over the digital communication link 600, in accordance with various embodiments of the invention.

The enhanced encoder 603 may encode each of the 8-bit words into an encoded word having n bits, for example. Generally, n is greater than eight (8) bits (n>8). Encoding the 8-bit words may generally be achieved by translating each 8-bit byte of data into a specially coded word having n bits where n is generally greater than eight (8). The additional (n−8) bits of data provide additional transmission overhead. The increased number of bits resulting from encoding may also provide data redundancy which may be utilized for error detection, for example.

The enhanced encoder 603 may encode at least a portion of at least a first word of one or more packets in a datastream. In this regard, the enhanced encoder 603 may reverse a running disparity of the encoded word. Hence, if an encoded running disparity of an encoded word is RD positive RD(+), then the enhanced encoder 603 reverses the running disparity to RD negative RD(−). Similarly, if an encoded running disparity is RD negative RD(−), then the enhanced encoder 603 reverses the running disparity to RD positive RD(+). The word may be a data word, control word or an idle word corresponding to a data packet, a control packet and an idle packet, respectively.

The enhanced encoder 603 may also assign n bits of information to each word, where n is greater than or equal to 1, thereby generating $2^n-1$ additional enhanced words having reversed running disparities. The words with the running disparity may comprise a secondary channel overlaid on the primary communication channel. The enhanced encoder 603 may control the secondary channel using the n assigned bits. In an aspect of the invention, the enhanced encoder 603 may dynamically change or resize the number of words in a packet utilized for enhanced encoding among various packets during enhanced encoding. Words utilized for enhanced encoding may be randomly selected among the packets by the enhanced encoder 603. The enhanced encoder may receive secondary channel information 614, which may be utilized for controlling the enhanced encoding of words. In this regard, the enhanced encoder may utilize the secondary channel information to control reversal of the running disparity.

Once the raw data bytes have been enhanced encoded by the encoder 603, the resulting coded data 611a may be multiplexed into a serial bitstream 609a by the multiplexer 604. In another embodiment of the invention, the resulting coded data 611a may also be converted a plurality of serial bit streams as in XAUI where 4 parallel lanes are utilized. Notwithstanding, the resulting enhanced multiplexed serial bitstream 609a may subsequently be transferred to the modulator 605 for processing. The modulator 605 may perform digital-to-analog conversion on the enhanced serial bitstream 609a, resulting in an equivalent or corresponding enhanced bitstream 609b. The resulting enhanced analog serial bitstream 609b may be transferred to the receiver side 602 via the link infrastructure 610.

The demodulator 606 on the receiver side 602 may be adapted to receive the enhanced analog serial bitstream 609b transferred from the transmitter side 601. The demodulator 606 may perform an analog-to-digital conversion on the received enhanced serial bitstream 609b, resulting in an enhanced serial digital bitstream 609c. The resulting enhanced serial digital bitstream 609c generated by the demodulator 606 may be transferred to the demultiplexer 607 for processing. The demultiplexer 607 may be configured to demultiplex the enhanced serial digital bitstream 609c by executing the opposite of the multiplexing function performed by multiplexer 604.

The demultiplexer 607 may translate the enhanced serial bitstream 609c back into an enhanced datastream 611b containing enhanced n-bit coded words. For example, in the case of gigabit Ethernet, the demultiplexer 607 may translate the serial bitstream 609c back into enhanced 10-bit coded words. The n-bit enhanced coded words produced by the demultiplexer 607 may subsequently be transferred to the enhanced decoder 608 for processing. The enhanced decoder 608 may be adapted to execute the opposite of the enhanced encoder function performed by the enhanced encoder 603. In this regard, the enhanced decoder 608 may convert the n-bit coded words back into 8-bit unencoded bytes. The enhanced decoder 608 may receive at least an encoded portion of a packet having a reversed disparity and a determination made as to whether the disparity has been reversed. Upon determining that the disparity has been reversed, the enhanced decoder may reverse the disparity. These 8-bit unencoded bytes, if previously encrypted, may be decrypted by an upstream component of the digital communication link 600, for example.

Figure 7:
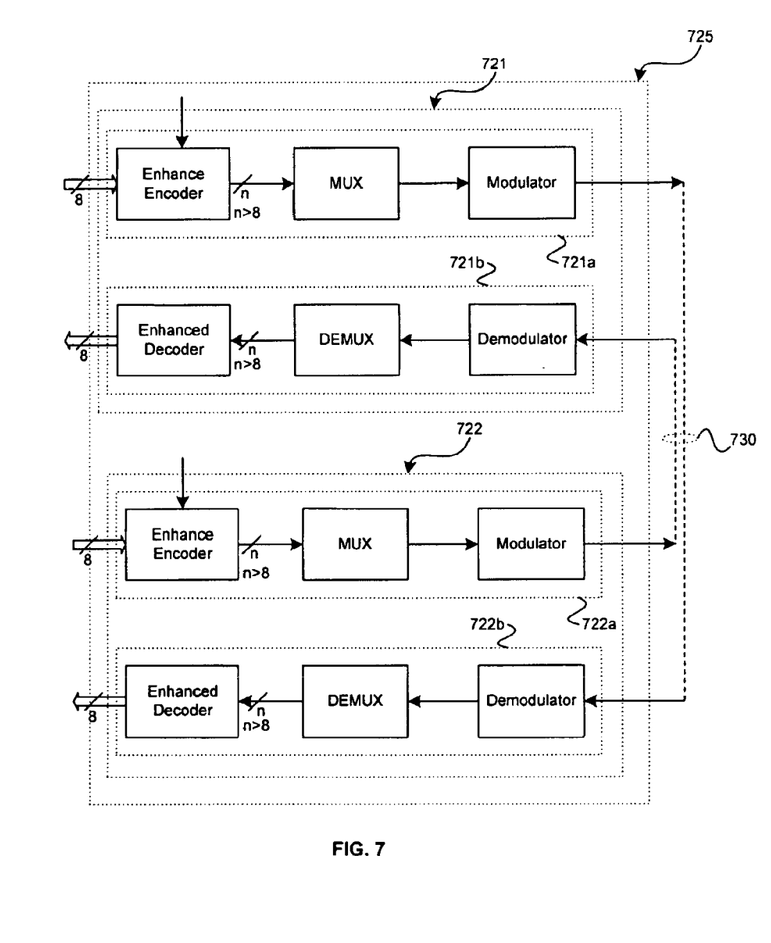
FIG. 7 is a block diagram of the exemplary system of FIG. 6 illustrating a duplex configuration in accordance with an embodiment of the invention.

The arrangements of FIG. 6 illustrates a half-duplex mode of operation. However, the invention is not limited in this regard and may be similarly applicable to a full-duplex mode of operation. FIG. 7 is a block diagram of the exemplary system of FIG. 6 illustrating a duplex configuration in accordance with an embodiment of the invention. Each side of the digital communication link may include a transceiver having a transmitter side and a receiver side, operating in full duplex mode. In this regard, each of the transceivers many simultaneously transmit and receive data.

Referring to FIG. 7, there is shown a first transceiver block 721 and a second transceiver block 722. The first transceiver block 721 may include a transmitter block 721a and a receiver block 721b. The second transceiver block 722 may include a transmitter block 722a and a receiver block 722b. The transmitter block 721a of first transceiver block 721 and the transmitter block 722a of the second transceiver block 722 may be configured to operate in a manner similar to the transmitter side 601 of FIG. 6. Similarly, the receiver block 721b of first transceiver block 721 and the receiver block 722b of the second transceiver block 722 may be configured to operate in a manner similar to the receiver side 702 of FIG. 6. The link infrastructure 730 may couple the transmitter block 721a to receiver block 722b and transmitter block 722a to receiver block 721b.

In an embodiment of the invention, the transmitter side 601 and the receiver side 602 may operate in a synchronous manner to provide enhanced encoding and enhanced decoding of the primary channel overlaid in the secondary channel. U.S. patent application Ser. No. 10/454,011 filed on Jun. 4, 2003, discloses a method and system for providing synchronous running encoding and encryption and is incorporated herein by reference in its entirety. Moreover, U.S. patent application Ser. No. 10/454,012 filed on Jun. 4, 2003, may be utilized in conjunction with the present invention and is incorporated herein by reference in its entirety. In this regard, an expanded control character for controlling data in each lane of the multilane communication channel may be further utilized for enhanced encoding and enhanced decoding of the primary channel overlaid in the secondary channel.

In light of the foregoing, aspects of the invention provide a secondary communication channel within a primary communication channel, using an enhanced encoding scheme, to effectively expand the utilized information capacity of the primary communication channel. The running disparity of certain data words in certain encoded packets of the primary communication channel stream are forced to the opposite running disparity in order to encode additional information. The additional information may include various system and status information.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing information in a primary communication channel, the method comprising:

encoding at least a portion of at least a first word of at least one packet in a datastream; and reversing a running disparity of said encoded at least a portion of said at least a first word of said at least one packet in said datastream.

2. The method according to claim 1, further comprising:

if said encoded running disparity of said encoded at least a portion of said at least a first word is RD positive RD(+), reversing said encoded running disparity to RD negative RD(−); and if said encoded running disparity of said encoded at least a portion of said at least a first word is RD negative RD(−), reversing said encoded running disparity to RD positive RD(+).

3. The method according to claim 1, further comprising assigning n bits of information to each of said at least a first word, where n is greater than or equal to 1.

4. The method according to claim 3, further comprising generating $2^n-1$ enhanced words having said reversed running disparity.

5. The method according to claim 3, further comprising controlling a secondary channel with said n assigned bits, wherein said secondary channel is overlaid on the primary communication channel.

6. The method according to claim 1, wherein said at least a first word is one of a data word, control word and idle word corresponding to a data packet, a control packet and an idle packet, respectively.

7. The method according to claim 1, further comprising dynamically resizing a number of words utilized for said encoding between said first word and a second word of said at least one packet.

8. The method according to claim 7, further comprising:
randomly selecting said first word from a corresponding first packet; and
randomly selecting said second word from a corresponding second packet.

9. The method according to claim 1, further comprising:
receiving said encoded at least a portion of said at least a first word having said reversed running disparity;
determining said reversed running disparity; and
reversing said reversed disparity of said encoded at least a portion of said at least a first word of said at least one packet in said datastream.

10. A machine-readable storage having stored thereon, a computer program having at least one code section for processing information in a primary communication channel, the at least one code section being executable by a machine for causing the machine to perform steps comprising:
encoding at least a portion of at least a first word of at least one packet in a datastream; and
reversing a running disparity of said encoded at least a portion of said at least a first word of said at least one packet in said datastream.

11. The machine-readable storage according to claim 10, further comprising:
code for reversing said encoded running disparity to RD negative RD(−) if said encoded running disparity of said encoded at least a portion of said at least a first word is RD positive RD(+); and
code for reversing said encoded running disparity to RD positive RD(+) if said encoded running disparity of said encoded at least a portion of said at least a first word is RD negative RD(−).

12. The machine-readable storage according to claim 10, further comprising code for assigning n bits of information to each of said at least a first word, where n is greater than or equal to 1.

13. The machine-readable storage according to claim 12, further comprising code for generating $2^n-1$ enhanced words having said reversed running disparity.

14. The machine-readable storage according to claim 12, further comprising code for controlling a secondary channel with said n assigned bits, wherein said secondary channel is overlaid on the primary communication channel.

15. The machine-readable storage according to claim 10, wherein said at least a first word is one of a data word, control word and idle word corresponding to a data packet, a control packet and an idle packet, respectively.

16. The machine-readable storage according to claim 10, further comprising code for dynamically resizing a number of words utilized for said encoding between said first word and a second word of said at least one packet.

17. The machine-readable storage according to claim 16, further comprising:
code for randomly selecting said first word from a corresponding first packet; and
code for randomly selecting said second word from a corresponding second packet.

18. The machine-readable storage according to claim 10, further comprising:
code for receiving said encoded at least a portion of said at least a first word having said reversed running disparity;
code for determining said reversed running disparity; and
code for reversing said reversed disparity of said encoded at least a portion of said at least a first word of said at least one packet in said datastream.

* * * * *